United States Patent
Kim et al.

(10) Patent No.: US 7,840,348 B2
(45) Date of Patent: Nov. 23, 2010

(54) OUTPUT CONTROL METHOD OF VOICE GUIDANCE SIGNAL IN NAVIGATION SYSTEM

(75) Inventors: Su Jin Kim, Gyeonggi-do (KR); Chang Won Park, Gyeonggi-do (KR); Hyun Woo Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1162 days.

(21) Appl. No.: 11/255,408

(22) Filed: Oct. 21, 2005

(65) Prior Publication Data

US 2006/0095203 A1    May 4, 2006

(30) Foreign Application Priority Data

Nov. 4, 2004    (KR) ............ 10-2004-0089180

(51) Int. Cl.
G01C 21/00 (2006.01)
G01C 21/32 (2006.01)

(52) U.S. Cl. .......... 701/211; 701/200; 701/212; 340/988; 340/990; 340/996

(58) Field of Classification Search .......... 701/200, 701/201, 211, 212; 342/357.13; 340/988, 340/990, 995, 996
See application file for complete search history.

(56) References Cited

U.S. PATENT DOCUMENTS

| 5,635,925 A | * | 6/1997 | Kishi et al. | 340/996 |
| 5,694,116 A | * | 12/1997 | Kojima | 340/576 |
| 5,799,264 A | * | 8/1998 | Mizutani et al. | 701/211 |
| 5,948,040 A | * | 9/1999 | DeLorme et al. | 701/201 |
| 6,208,932 B1 | * | 3/2001 | Ohmura et al. | 701/200 |
| 6,298,305 B1 | * | 10/2001 | Kadaba et al. | 701/211 |
| 6,347,280 B1 | * | 2/2002 | Inoue et al. | 701/211 |
| 6,347,299 B1 | * | 2/2002 | Holzman et al. | 704/270 |
| 6,363,322 B1 | * | 3/2002 | Millington | 701/211 |
| 2006/0080034 A1 | * | 4/2006 | Hayashi | 701/211 |

* cited by examiner

Primary Examiner—Khoi Tran
Assistant Examiner—Jorge O Peche
(74) Attorney, Agent, or Firm—Lee, Hong, Degerman, Kang & Waimey

(57) ABSTRACT

An output control method of voice guidance signal in navigation system, the method comprising: searching for a travel route from a starting location to a destination of a vehicle; guiding the vehicle to travel along the searched travel route, and determining a current vehicle location if the vehicle is traveling, searching for a target location to be guided ahead of the traveling vehicle; generating a voice guidance signal for the searched target location to be guided; determining the priorities of a plurality of voice guidance signals in advance and outputting the voice guidance signals in sequence according to the predetermined priorities if the plurality of voice guidance signals conflict thereamong.

16 Claims, 3 Drawing Sheets

OUTPUT CONTROL METHOD OF VOICE GUIDANCE SIGNAL IN NAVIGATION SYSTEM

Pursuant to 35 U.S.C. §119(a), this application claims the benefit of earlier filing date and right of priority to Korean Patent Application No. 10-2004-0089180, filed on Nov. 4, 2004, the content of which is hereby incorporated by reference herein in its entirety.

BACKGROUND OF THE INVENTION

1. Field of the Invention

The present invention relates to an output control method of audio guidance signal in a navigation system adapted to search for a travel route from a current vehicle location to a destination and to guide a user in steering a vehicle to the searched travel route, wherein if a plurality of voice guidance signals to be outputted are generated and conflict with one another, an output order of the plurality of voice guidance signals is controlled.

2. Description of the Related Art

As the number of mobile objects such as cars continuously increases, traffic congestion becomes more critical. Particularly, there is a serious problem in that the rate of increase in the number of vehicles is much higher than the rate at which roads and other infrastructures are being expanded.

As one of the solutions to such traffic congestion, attention has been paid to a navigation system. In such a navigation system, a GPS (Global Positioning System) receiver receives navigation messages transmitted by GPS satellites and a sensor unit is installed in a vehicle to detect travel conditions such as the travel speed and direction of the vehicle. Further, the navigation system determines a current vehicle location based on the received navigation messages and the detected travel conditions of the vehicle, and matches the determined current vehicle location to map data so that the current vehicle location can be displayed on a display unit. Moreover, if there is a target location to be guided, including an intersection, or an access or exit of an interchange of an expressway, an urban highway or the like ahead of a traveling vehicle, a voice guidance signal is outputted so that the vehicle can be guided in view of the travel direction thereof at the corresponding target location to be guided.

Therefore, a vehicle user hereinafter referred to as a user can check a current vehicle location and a shortest route from the current location to a destination using the navigation system. Further, under the guidance of the navigation system, the user can beforehand search for a travel route along which a vehicle travels and be guided by means of video and audio signals to steer the vehicle along the searched travel route, enabling to efficiently use the road systems.

Meanwhile, when a vehicle is guided in traveling by means of a guidance audio signal, there may be a case where while a first to-be-guided target location exists at a position within a predetermined distance ahead of the traveling vehicle and a first guidance audio signal for the first to-be-guided target location is being outputted, a second to-be-guided target location exists at a position within the predetermined distance ahead of the traveling vehicle and a second voice guidance signal for the second to-be-guided target location is to be outputted. In this case, the first and second voice guidance signals conflict with each other.

To solve the problem, a Korean Patent Application No. 2003-1640 (Laid-Open Publication No. 2004-64789) was filed by the present applicant. In the application, if there are a plurality of voice guidance signals to be outputted, the levels of the plurality of the voice guidance signals are controlled and then outputted at a time. That is, according to the prior art, if a second voice guidance signal is to be outputted while a first voice guidance signal is being outputted, the level of the first voice guidance signal that is being currently outputted is lowered and the level of the second voice guidance signal is raised so that a vehicle user can clearly listen to the second voice guidance signal that newly begins to be outputted.

However, the prior art is simply designed to lower the output level of the first voice guidance signal, which is being currently outputted, and to raise the output level of the new second voice guidance signal, irrespective of the priority of a voice guidance signal. Therefore, if the priority of the first voice guidance signal is higher than that of the second voice guidance signal, the vehicle user cannot fully listen to the first voice guidance signal with a higher priority. Accordingly, there are many problems in that the travel of a vehicle cannot be correctly guided and safe driving is greatly obstructed.

SUMMARY OF THE INVENTION

Accordingly, it is an object of the present invention to provide a method for controlling the output of a voice guidance signal in a navigation system, wherein the priorities of a plurality of voice guidance signals are determined in advance and the voice guidance signals are outputted in sequence according to the predetermined priorities if the plurality of voice guidance signals conflict thereamong.

It is another object of the present invention to provide a method for controlling the output of a voice guidance signal in a navigation system, wherein if a first voice guidance signal is being currently outputted and a plurality of second voice guidance signals are to be outputted, the first voice guidance signal is continuously outputted while the output of the second voice guidance signals is out on standby, and one of the second voice guidance signals that are on standby is then selected and outputted according to their priorities when the output of the first voice guidance signal has been completed.

According to an aspect of the present invention for achieving the objects, there is provided a method for controlling the output of a voice guidance signal in a navigation system, comprising: searching for a travel route from a starting location to a destination of a vehicle; guiding the vehicle to travel along the searched travel route, and determining a current vehicle location if the vehicle is traveling, searching for a target location to be guided ahead of the traveling vehicle; generating a voice guidance signal for the searched target location to be guided; determining the priorities of a plurality of voice guidance signals in advance and outputting the voice guidance signals in sequence according to the predetermined priorities if the plurality of voice guidance signals conflict thereamong.

In the present invention, the conflict of the output of the voice guidance signals comprising: when a voice guidance signal is being currently outputted, a plurality of other voice guidance signals are to be outputted, then outputting continuously the first voice guidance signal being currently outputted and causing the generated voice guidance signals to be put on standby, and selecting one of the voice guidance signals that are on standby as a second voice guidance signal according to their priorities and outputting the second voice guidance signal when the output of the first voice guidance signal has been completed.

According to another aspect of the present invention, there is provided a method for controlling the output of a voice guidance signal in a navigation system, comprising: searching for a travel route from a starting location to a destination of a vehicle; guiding the vehicle to travel along the searched travel route, and determining a current vehicle location if the vehicle is traveling, searching for a target location to be guided ahead of the traveling vehicle; generating a voice guidance signal for the searched target location to be guided; selecting one of the generated voice guidance signal and other guidance audio signals, which are on standby, according to a predetermined priorities thereof, the other voice guidance signals being put on standby; and outputting the selected voice guidance signal by the voice guidance signal output unit if a voice guidance signal output unit does not currently output a voice guidance signal.

In the present invention, priorities are assigned to voice guidance signals according to the kind of a to-be-guided target location to be guided, and whether guidance is an initial guidance, an intermediate guidance or a last guidance. For example, a voice guidance signal for guiding arrival at a destination is designated as a voice guidance signal with a first priority.

a voice guidance signal for guiding arrival at a destination is designated as a voice guidance signal with a first priority; If a predetermined to-be-guided target location is guided three times with voice guidance signals including initial, intermediate and last voice guidance signals, the last voice guidance signal issued just before a vehicle passes by the predetermined target location is designated as a voice guidance signal with a second priority; A voice guidance signal for guiding a dangerous area is designated as a voice guidance signal with a third priority; The initial or intermediate guidance audio signal for the predetermined to-be-guided target location is designated as a voice guidance signal with a fourth priority; Voice guidance signals for guidance of a joining point, an entrance to a comfort stop, straight driving, a registration area and the like are designated as voice guidance signals with a fifth priority.

The starting location and the current vehicle location of the vehicle may be a location searched for by means of combined navigation using navigation messages received by a GPS receiver and a detection signal of a travel condition of the vehicle detected by a sensor unit.

The selection of the one of the voice guidance signals may be performed after an invalid voice guidance signal is canceled among the voice guidance signals that are currently on standby. The invalid voice guidance signal may be a voice guidance signal corresponding to a target location to be guided by which the vehicle has passed.

The method may further comprise causing the selected voice guidance signal to be put on standby if it is determined that the voice guidance signal output unit currently outputs a voice guidance signal.

Further, the method of the present invention may further comprise matching the determined current vehicle location to map data and displaying the matched current vehicle location on a display unit while outputting the voice guidance signal for the target location to be guided.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, a method for controlling the output of a voice guidance signal in a navigation system according to the present invention will be described in detail with reference to accompanying drawings.

Figure 1:
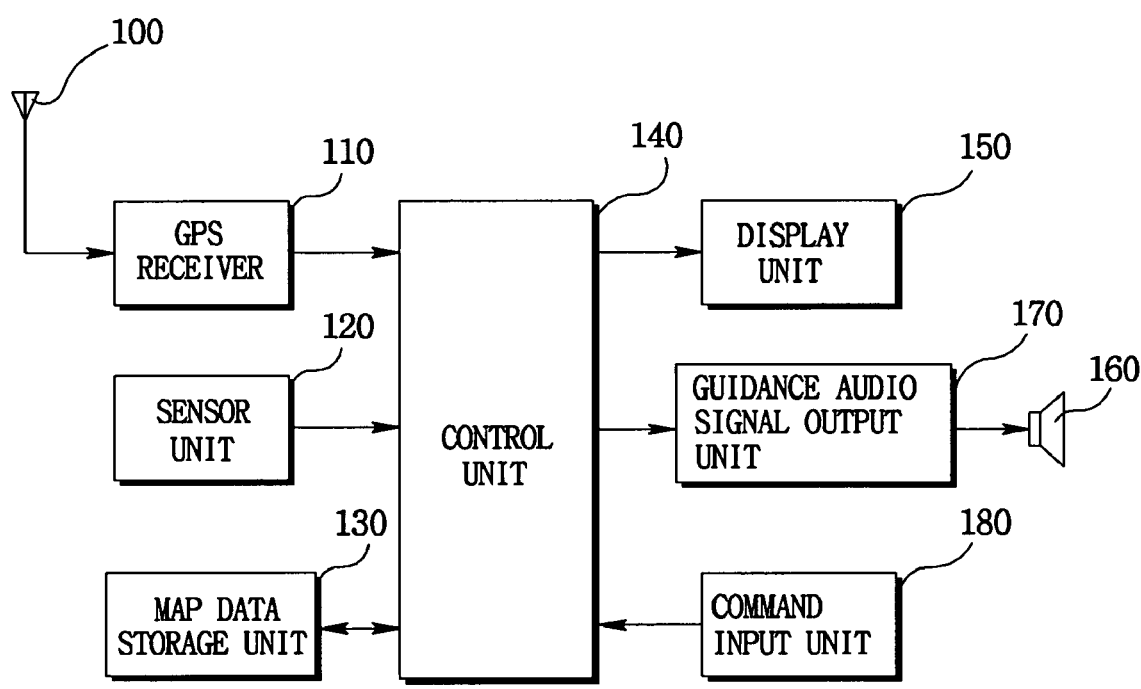
FIG. 1 is a block diagram showing a configuration of a navigation system to which a method for controlling the output of a voice guidance signal according to the present invention is applied; and FIG. 2a and FIG. 2b is a flow chart illustrating the method for controlling the output of a voice guidance signal according to the present invention.

FIG. 1 is a block diagram showing a configuration of a navigation system to which a method for controlling the output of a voice guidance signal according to the present invention is applied. Referring to FIG. 1, the navigation system comprises a GPS receiver (110) for receiving a navigation message, transmitted by a GPS satellite through an antenna (100); a sensor unit (120) including a gyroscope, a speed sensor and the like installed on a vehicle for detecting travel conditions of the vehicle; a map data storage unit (130) for beforehand storing map data; a control unit (140) for performing control under which a current vehicle location is determined based on the navigation message received by the GPS receiver (110) and detection signals of the travel conditions of the vehicle detected by the sensor unit (120), the determined current vehicle location is displayed by matching it to the map data stored in the map data storage unit (130), and the travel of the vehicle is guided with a voice guidance signal; a display unit (150) for displaying a map and the current vehicle location under the control of the control unit (140); a voice guidance signal output unit (170) for outputting a voice guidance signal to a speaker (160) under the control of the control unit (140); and a command input unit (180) for inputting an operation command relative to a user's manipulation into the control unit (140).

When a user manipulates the command input unit (180) to instruct a search for a travel route in the navigation system thus constructed, a starting location and a destination of the vehicle are inputted into the control unit (140) through the command input unit (180). When the starting location and the destination of the vehicle are inputted, the control unit (140) retrieves map data on a predetermined area including the starting location and the destination from the map data storage unit (130). A travel route from the starting location to the destination is searched for from the retrieved map data, based on a shortest route from the starting location to the destination, a principle by which an expressway has a higher priority, and the like. The searched travel route is displayed on the display unit (150) so that the user can check the travel route.

When the vehicle starts to travel after the travel route of the vehicle has been searched for, the GPS receiver (110) receives a navigation message transmitted by the GPS satellite through the antenna (100) and then inputs the navigation message into the control unit (140). Further, the sensor unit (120) detects travel conditions of the vehicle and outputs detection signals of the travel conditions that in turn are inputted into the control unit (140).

The control unit (140) discriminates a current vehicle location based on the received navigation message and the detection signals of the travel conditions of the vehicle. The control unit (140) matches the determined current vehicle location to map data retrieved from the map data storage unit (130) and outputs the matched current vehicle location to the display unit (150), displaying the current vehicle location together with a map.

Then, the control unit (140) discriminates whether there is a target location to be guided with a voice guidance signal ahead of the traveling vehicle. For example, discrimination is made s to whether there is a U-turn area, a divide, a dangerous area, a merging area, a destination, or the like. If it is discriminated that there is a to-be guided target location, the control unit (140) generates a relevant voice guidance signal relative to the to-be-guided target location, and the voice guidance signal output unit (170) outputs the generated voice guidance signal to the speaker (160) so that the user can listen to the voice guidance signal.

If a first voice guidance signal is being outputted by the voice guidance signal output unit (170) to the speaker (160) while a plurality of generated voice guidance signals are to be outputted, the voice guidance signal output unit (170) continuously outputs the first voice guidance signal to the speaker (160), and the control unit (140) causes the generated voice guidance signals to be put on standby and selects one of the voice guidance signals, which are on standby, as a second voice guidance signal according to the priorities of the voice guidance signals. When the voice guidance signal output unit (170) completes the output of the first voice guidance signal, the control unit (140) causes the voice guidance signal output unit (170) to output the selected voice guidance signal to the speaker (160).

Figure 2A:
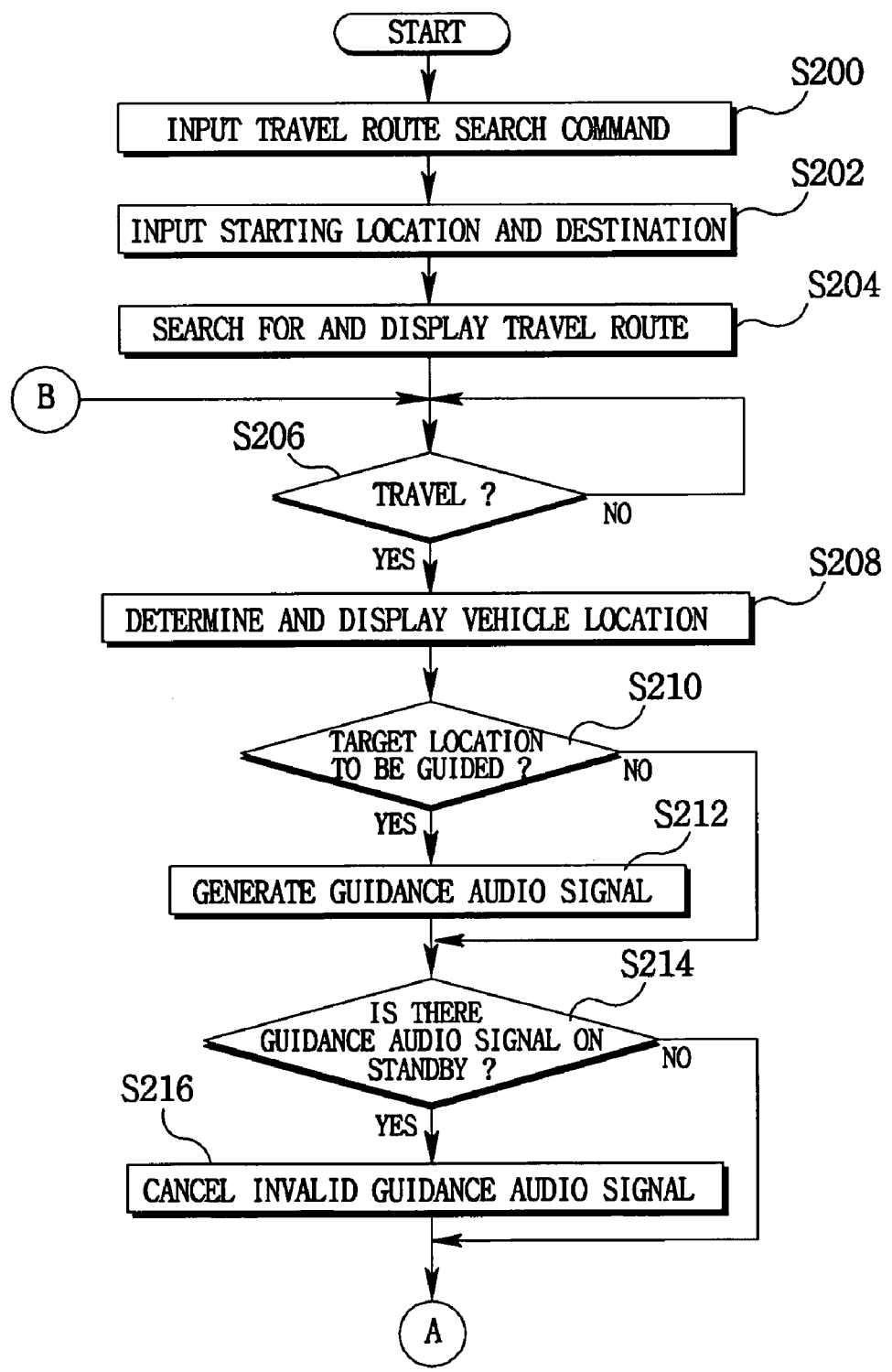
Figure 2B:
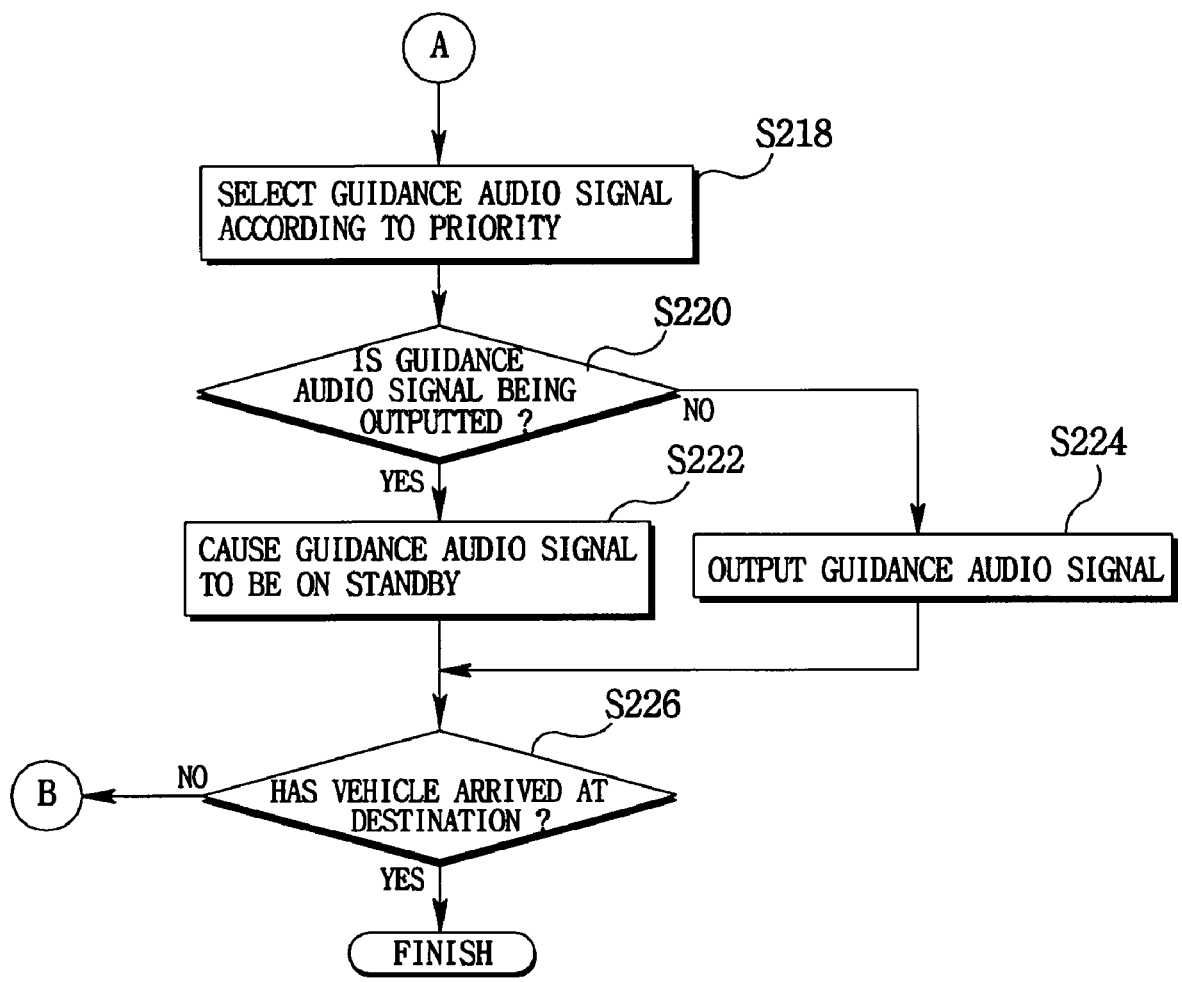

Meanwhile, FIG. 2a and FIG. 2b is a flow chart illustrating a method for controlling the output of a voice guidance signal according to the present invention. Referring the FIG. 2a and FIG. 2b, when a travel route search command is inputted from the command input unit (180) (step S200), a starting location and a destination of a vehicle are inputted from the command input unit (180) into the control unit (140) (step S202).

The starting location of the vehicle may be designated as a current vehicle location that has been searched for by means of combined navigation using the navigation message received by the GPS receiver (110) and the detection signals of the travel conditions of the vehicle detected by the sensor unit (120). In other words, the GPS receiver (110) receives the navigation message and outputs a DOP (Dilution of Precision) value using the received navigation message. The DOP value is low if there is reliability in the current vehicle location calculated by the received navigation message, but is high if there is no reliability. Therefore, the control unit (140) determines the reliability of the navigation message based on the DOP value. If the DOP value is less than a predetermined threshold, it is determined that there is reliability, and a current vehicle location is then detected using the navigation message. If the DOP value is not less than the predetermined threshold, it is determined that there is no reliability. If there is no reliability, the control unit (140) detects a current vehicle location using combined navigation by which the current vehicle location is detected by detection signals of the sensor unit (120) from a final location of the vehicle detected by the navigation message of reliability. Then, a detected current vehicle location is designated as the staring location of the vehicle.

Once the starting location and the destination of the vehicle are determined, the control unit (140) searches for a travel route of the vehicle from the starting location to the destination of the vehicle using the map data stored in the map data storage unit (120) and displays the travel route on the display unit (150) enabling the user to check the travel route (step S204).

Successively, discrimination is made as to whether the vehicle is traveling (step S206). If it is discriminated that the vehicle is traveling, the control unit (140) determines a current vehicle location by means of the combined navigation using the navigation message received by the GPS receiver (110) and the detection signals of the travel conditions of the vehicle detected by the sensor unit (120), matches the discriminated current vehicle location to the map data stored in the map data storage unit (130), and displays the matched current vehicle location on the display unit (150), so that the vehicle user can check the current vehicle location and the travel conditions of the vehicle (step S208).

Thereafter, the control unit (140) discriminates whether a predetermined target location to be guided exists ahead of the traveling vehicle (step S210). If it is discriminated that the target location to be guided exits, a voice guidance signal corresponding to the to-be-guided target location is generated (step S212).

Then, the control unit (140) discriminates whether there are guidance audio signals that cannot be currently outputted and are put on standby (step S214). If it is discriminated that there are voice guidance signals which are put on standby, the control unit (140) cancels all invalid voice guidance signals among the voice guidance signals which are on standby (step S216). That is, voice guidance signals corresponding to the to-be-guided target locations by which the vehicle has passed among the voice guidance signals that cannot be currently outputted and are on standby are voice guidance signals that are not needed to be outputted. Therefore, in the present invention, the control unit (140) extracts and cancels all the invalid voice guidance signals.

Then, the control unit (140) compares the priority of the voice guidance signal generated in step S212 and the priorities of the voice guidance signals that are currently on standby with one another, and selects a voice guidance signal with the highest priority (step S218).

Next, the priority of a voice guidance signal will be described.

As to guidance for a predetermined target location to be guided, such as left turn, right turn, U turn, turn in the four-o'clock direction or turn in the eight-o'clock direction; joining or branch of a right or left road; or access to or avoidance from an overpass or underpass, there is little difference between respective navigation systems. However, the guidance is generally performed three times: an initial guidance performed at a position farthest from a relevant target location to be guided; an intermediate guidance performed when a vehicle somewhat approaches the relevant target location to be guided, e.g., when the vehicle exists at a distance of about 300 m before the relevant target location to be guided; and a last guidance performed when the vehicle exits at a distance of about 100 m before the relevant to-be-guided target location.

In the present invention, priorities are assigned to voice guidance signals according to the kind of a to-be-guided target location to be guided, and whether guidance is an initial guidance, an intermediate guidance or a last guidance. For example, a voice guidance signal for guiding arrival at a destination is designated as a voice guidance signal with a first priority.

If a predetermined to-be-guided target location is guided three times with voice guidance signals including initial, intermediate and last voice guidance signals, the last voice guidance signal issued just before a vehicle passes by the predetermined target location is designated as a voice guidance signal with a second priority. A voice guidance signal for guiding a dangerous area is designated as a voice guidance signal with a third priority. The initial or intermediate guidance audio signal for the predetermined to-be-guided target location is designated as a voice guidance signal with a fourth priority. Voice guidance signals for guidance of a joining point, an entrance to a comfort stop, straight driving, a registration area and the like are designated as voice guidance signals with a fifth priority.

After the control unit (140) selects a voice guidance signal with a highest priority in step S218, it discriminates whether the voice guidance signal output unit (170) currently outputs a certain voice guidance signal (step S220).

If it is discriminated in step S220 that the voice guidance signal output unit (170) currently outputs a certain voice guidance signal, the control unit (140) causes the selected voice guidance signal to be put on standby (step S222).

If it is discriminated in step S220 that the voice guidance signal output unit (170) does not currently output a certain voice guidance signal, the control unit (140) provides the selected voice guidance signal to the voice guidance signal output unit (170) that in turn outputs the selected voice guidance signal to the speaker (160) (step S224).

The control unit (140) discriminates whether the vehicle has arrived at a destination (step S226). If it is discriminated that the vehicle has not yet arrived at the destination, flow returns to step S206 and the control unit (140) repeatedly performs the operations for determining a current vehicle location of the traveling vehicle, matching and displaying the current vehicle location, generating a voice guidance signal for a to-be-guided target location if the to-be-guided target location exists ahead of the traveling vehicle, selecting one of the generated voice guidance signals and voice guidance signals, which are on standby, according to their priorities, and outputting the selected voice guidance signal.

If it is discriminated in step S226 that the vehicle has arrived at the destination, the control unit (140) terminates the operation for guiding the travel of the vehicle.

As described above, priorities are assigned to voice guidance signals according to target locations to be guided. If the voice guidance signals conflict with one another, the voice guidance signals are selected and outputted in sequence according to the priorities assigned in advance. Therefore, there are advantages in that a vehicle user can sequentially listen to the voice guidance signals in the order of higher priorities so that the user can receive a correct guidance for the travel of the vehicle and be greatly assisted in driving the vehicle safely.

Although the present invention has been illustrated and described in connection with the preferred embodiment, it will be readily understood by those skilled in the art that various adaptations and changes can be made thereto without departing from the spirit and scope of the present invention defined by the appended claims.

What is claimed is:

1. A method for controlling the output of a voice guidance signal in a navigation system, the method comprising:
    searching for a travel route from a starting location to a destination of a vehicle;
    guiding the vehicle to travel along the searched travel route;
    determining a current vehicle location when the vehicle is traveling;
    searching for a target location to be guided that exists ahead of the traveling vehicle;
    generating a voice guidance signal for the searched target location;
    determining a priority according to a distance relationship between the current vehicle location and the searched target location and a specific characteristic of the searched target location;
    assigning the priority to the generated voice guidance signal in advance; and
    outputting the generated voice guidance signal in conflict with an output of a plurality of voice guidance signals when the generated voice guidance signal has a highest priority,
    wherein determining the priority comprises:
        designating a voice guidance signal for guiding arrival at a destination with a first priority;
        designating a last voice guidance signal issued just before the vehicle passes by a predetermined target location to be guided with a second priority when the predetermined target location to be guided is guided three times with voice guidance signals including initial, intermediate and last voice guidance signals;
        designating a voice guidance signal for guiding a dangerous area with a third priority;
        designating an initial or intermediate voice guidance signal for the predetermined target location to be guided with a fourth priority; and
        designating a voice guidance signal for guidance of a joining point, an entrance to a comfort stop, straight driving, or a registration area with a fifth priority.

2. The method as claimed in claim 1, wherein the priority is assigned according to whether guidance is an initial guidance, an intermediate guidance or a last guidance.

3. The method as claimed in claim 1, wherein outputting the generated voice guidance signal comprises:
    outputting a first voice guidance signal being currently output when a plurality of other voice guidance signals are generated for output;
    causing the plurality of other voice guidance signals to be placed on standby;
    selecting one of the plurality of other voice guidance signals on standby as a second voice guidance signal according to the highest priority; and
    outputting the second voice guidance signal when the output of the first voice guidance signal has been completed.

4. The method as claimed in claim 1, wherein the starting location and the current vehicle location of the vehicle are locations searched by combining a navigation message received by a global positioning system (GPS) receiver and a detection signal of a travel condition of the vehicle detected by a sensor unit.

5. The method as claimed in claim 1, further comprising:
    matching the current vehicle location to map data; and
    displaying the matched current vehicle location on a display unit.

6. A method for controlling the output of a voice guidance signal in a navigation system, the method comprising:
    searching for a travel route from a starting location to a destination of a vehicle;
    guiding the vehicle to travel along the searched travel route;
    determining a current vehicle location if the vehicle is traveling;
    searching a to-be-guided target location ahead of the traveling vehicle;
    generating a first plurality of voice guidance signals for the searched to-be-guided target location;
    placing a second plurality of previously-generated voice guidance signals on standby according to predetermined priorities;
    selecting a generated voice guidance signal among the first plurality of voice guidance signals and the second plurality of previously-generated voice guidance signals on standby; and outputting the selected voice guidance signal by a voice guidance signal output unit if the voice guidance signal output unit does not currently output a voice guidance signal, wherein determining the priority comprises:

designating a voice guidance signal for guiding arrival at a destination with a first priority;

designating a last voice guidance signal issued just before the vehicle passes by a predetermined target location to be guided with a second priority when the predetermined target location to be guided is guided three times with voice guidance signals including initial, intermediate and last voice guidance signals;

designating a voice guidance signal for guiding a dangerous area with a third priority;

designating an initial or intermediate voice guidance signal for the predetermined target location to be guided with a fourth priority; and designating a voice guidance signal for guidance of a joining point, an entrance to a comfort stop, straight driving, or a registration area with a fifth priority.

7. The method as claimed in claim 6, wherein the predetermined priorities are assigned to the first plurality of voice guidance signals according to a description of the to-be-guided target location, and whether or not guidance of the to-be-guided target location is an initial guidance, an intermediate guidance or a last guidance.

8. The method as claimed in claim 7, wherein selecting the generated voice guidance signal is performed after an invalid voice guidance signal is canceled among the voice guidance signals that are currently on standby.

9. The method as claimed in claim 8, wherein the invalid voice guidance signal is a voice guidance signal corresponding to a to-be-guided target location by which the vehicle has passed.

10. The method as claimed in claim 7, further comprising:
causing the selected voice guidance signal to be put on standby if it is determined that the voice guidance signal output unit currently outputs the voice guidance signal.

11. The method as claimed in claim 6, wherein selecting the generated voice guidance signal is performed after an invalid voice guidance signal is canceled among the voice guidance signals that are currently on standby.

12. The method as claimed in claim 11, wherein the invalid voice guidance signal is a voice guidance signal corresponding to a to-be-guided target location by which the vehicle has passed.

13. The method as claimed in claim 6, further comprising:
causing the selected voice guidance signal to be put on standby if it is determined that the voice guidance signal output unit currently outputs the voice guidance signal.

14. The method as claimed in claim 6, wherein the starting location and the current vehicle location are locations searched by combining a navigation message received by a GPS receiver and a detection signal of a travel condition of the vehicle detected by a sensor unit.

15. The method as claimed in claim 6, further comprising:
matching the determined current vehicle location to map data; and
displaying the matched current vehicle location on a display unit.

16. An apparatus for controlling the output of a voice guidance signal in a navigation system, the apparatus comprising:

a global positioning system (GPS) receiver configured to receive a navigation message;

a sensor unit configured to detect travel conditions of a vehicle;

a map data storage unit configured to store map data;

a control unit configured to search for a travel route from a starting location to a destination of the vehicle using the stored map data;

a display unit configured to display the searched travel route and a current vehicle location; and a voice guidance signal output unit configured to output a voice guidance signal, wherein the control unit guides the vehicle to travel along the searched travel route, wherein the control unit determines the current vehicle location when the vehicle is traveling by using the received navigation message and the detected travel conditions of the vehicle, wherein the control unit searches for a target location to be guided that exists ahead of the traveling vehicle, wherein the control unit generates a voice guidance signal for the searched target location, wherein the control unit determines a priority according to a distance relationship between the current vehicle location and the searched target location and a specific characteristic of the searched target location, wherein the control unit assigns the priority to the generated voice guidance signal in advance, wherein the control unit provides the generated voice guidance signal in conflict with an output of a plurality of voice guidance signals when the generated voice guidance signal has a highest priority, and wherein the control unit designates a voice guidance signal for guiding arrival at a destination with a first priority, designates a last voice guidance signal issued just before the vehicle passes by a predetermined target location to be guided with a second priority when the predetermined target location to be guided is guided three times with voice guidance signals including initial, intermediate and last voice guidance signals, designates a voice guidance signal for guiding a dangerous area with a third priority, designates an initial or intermediate voice guidance signal for the predetermined target location to be guided with a fourth priority, and designates a voice guidance signal for guidance of a joining point, an entrance to a comfort stop, straight driving, or a registration area with a fifth priority when the control unit determines the priority.

* * * * *